United States Patent [19]
Westbrooks, Jr. et al.

[11] Patent Number: 6,073,547
[45] Date of Patent: Jun. 13, 2000

[54] FOOD TEMPERATURE MAINTENANCE APPARATUS

[75] Inventors: John W. Westbrooks, Jr., Christiana; Randal L. Delbridge, Murfreesboro, both of Tenn.

[73] Assignee: Standex International Corporation, Del.

[21] Appl. No.: 09/395,016

[22] Filed: Sep. 13, 1999

[51] Int. Cl.[7] .............................. A23L 1/00; A21B 1/00; F24B 13/00; F24B 29/00

[52] U.S. Cl. ................................ 99/468; 99/357; 99/467; 99/470; 99/476; 99/483; 99/484; 99/517; 62/331; 165/48.1; 165/63; 165/64; 165/919; 312/236; 312/410; 219/387; 219/400

[58] Field of Search ............................ 99/330–334, 339, 99/340, 357, 467–470, 473–476, 483, 484, 516, 517; 62/237, 331; 165/48.1, 61, 206, 63, 64, 918, 919; 219/400, 387; 312/236, 410

[56] References Cited

U.S. PATENT DOCUMENTS

| | | |
|---|---|---|
| Re. 30,623 | 5/1981 | Schulz et al. . |
| 2,616,269 | 11/1952 | Reynolds ............................... 62/331 X |
| 3,160,452 | 12/1964 | Rothman . |
| 3,199,579 | 8/1965 | Foster et al. . |
| 3,240,544 | 3/1966 | Heckel, Jr. et al. . |
| 3,275,393 | 9/1966 | Stentz et al. . |
| 3,470,942 | 10/1969 | Fukada et al. ........................... 165/919 |
| 3,516,485 | 6/1970 | Rhoads et al. ........................ 312/236 X |
| 3,682,643 | 8/1972 | Foster ................................... 219/400 X |
| 3,797,563 | 3/1974 | Hoffman et al. ......................... 165/919 |
| 3,884,213 | 5/1975 | Smith ..................................... 99/483 X |
| 3,908,749 | 9/1975 | Williams . |
| 3,965,969 | 6/1976 | Williamson ........................... 99/357 X |
| 4,156,454 | 5/1979 | Skala ..................................... 99/357 X |
| 4,203,486 | 5/1980 | Rubbright et al. . |
| 4,225,204 | 9/1980 | Bellavoine ............................... 165/918 |
| 4,250,955 | 2/1981 | Plattner et al. ........................ 99/484 X |
| 4,377,109 | 3/1983 | Brown et al. .......................... 99/468 X |
| 4,460,814 | 7/1984 | Diesch et al. ......................... 99/517 X |
| 4,506,652 | 3/1985 | Baker et al. ........................... 99/470 X |
| 5,069,273 | 12/1991 | O'Hearne . |
| 5,449,232 | 9/1995 | Westbrooks, Jr. et al. . |
| 5,655,595 | 8/1997 | Westbrooks, Jr. . |
| 5,797,445 | 8/1998 | Westbrooks, Jr. et al. . |

Primary Examiner—Timothy Simone
Attorney, Agent, or Firm—Luedeka, Neely & Graham, PC

[57] ABSTRACT

A food temperature maintenance cart transports meals of hot and cold food items prepared at a meal assembly area to a meal serving area where the meals are to be served, while keeping hot foods hot and cold foods cold for extended periods of time. The cart includes a cabinet having tray storage compartments for storing meal serving trays containing refrigerated and heated food items. Thermal barriers subdivide each of the tray storage compartments into a refrigerated compartment for maintaining refrigerated foods in a refrigerated state and a heated compartment for maintaining heated foods in a heated state. A refrigerated air delivery compartment separates adjacent refrigerated compartments and produces laminar flows of refrigerated air across refrigerated food items contained on the trays. A refrigeration blower pulls return air from the lower portion of the refrigerated compartments, up through a refrigeration return plenum containing a refrigeration coil which re-cools the air, and then forces the refrigerated air downwardly through refrigerated air supply plenums and out into the refrigerated compartments in laminar flow across the trays. Each of the heated compartments are heated by a vertically oriented, elongate resistance heating element positioned within a heated air supply plenum. A heater blower pulls return air from the upper portion of the heated compartment and forces the return air downwardly across the elongate heating element which re-heats the air. The heated air is then forced out of the heated air supply plenum into the heated compartment in laminar flow across the trays.

15 Claims, 5 Drawing Sheets

FOOD TEMPERATURE MAINTENANCE APPARATUS

TECHNICAL FIELD

The present invention relates to temperature maintenance of food. More particularly, it relates to a food temperature maintenance cart having pressurized hot and cold air plenums for delivering laminar flows of heated and refrigerated air over food items stored on trays within the cart to keep hot food items hot and cold food items cold.

BACKGROUND

The preparation of meals in institutional settings, such as hospitals, typically involves preparing the meals at a remote food preparation area, such as a hospital kitchen, and then transporting the prepared meals to the patients' rooms for consumption. At the food preparation area, various hot and cold food items are heated or chilled to an optimum temperature and then assembled on trays for serving. When large numbers of meals are to be prepared, transported, and served, food palatability often suffers as the time required to transport and serve the meals results in food being served at less than optimum temperatures. Additionally, the extended time often required to transport and serve the meals can result in food temperatures that do not meet governmental mandates.

What is needed, therefore, is an efficient and effective food temperature maintenance apparatus for transporting large numbers of prepared meals containing hot and cold food items placed on food service trays, and for maintaining the temperature of the hot and cold food items for an extended time after the meals are prepared.

SUMMARY

The present invention provides a food temperature maintenance apparatus for maintaining refrigerated food items placed on meal serving trays in a refrigerated state and for maintaining heated food items placed on the meal serving trays in a heated state. The apparatus includes a cabinet having first and second tray storage compartments for storing meal serving trays containing refrigerated and heated food items. Two doors at the front of the cabinet provide access to the tray storage compartments. A refrigerated air delivery compartment separates the first and second tray storage compartments. Each of the tray storage compartments are further subdivided by thermal barriers to provide two refrigerated compartments for holding refrigerated food items in a refrigerated state and two heated compartments for holding heated food items in a heated state. The two refrigerated compartments are positioned adjacent the refrigerated air delivery compartment. A refrigerator provides refrigerated air within the refrigerated air delivery compartment. Means are also provided for heating the heated compartments.

The refrigerated air delivery compartment includes refrigeration supply plenums adjacent the refrigerated compartments. Each refrigeration supply plenum includes perforations to allow refrigerated air to exit the refrigerated air delivery compartment into the refrigerated compartments. A refrigeration return plenum having an inlet adjacent the bottom of the cabinet receives return air from each of the refrigerated compartments. A refrigeration fan or blower pulls return air into the refrigeration return plenum inlet and across a refrigeration coil positioned in the refrigeration return plenum, which re-cools the return. The refrigerated air is then forced into the refrigeration supply plenums by the blower and out to the refrigerated compartments through the perforations where the refrigerated air flows substantially laminarly across the trays. The refrigerated air spills off of the trays and travels downwardly along a forward air return area between the front of the trays and the door and a rearward air return area between the back of the trays and the back of the cabinet to the return plenum inlet where the air is cycled back across the refrigeration coil by the blower.

Heated air is provided to each of the heated compartments by separate but substantially identical heaters. Each heater includes a heated air plenum having a plurality of through openings for supplying heated air to the heated compartment. An elongate heating element for generating heat is positioned in the heated air plenum. In a preferred embodiment, the elongate heating element is a vertically oriented electrical resistance heating element having a length at least as great as 50% of the height of the cabinet. The heating element is mounted to a vertical heat transfer plate and radiates heat via a combination heat-sink and element clamp. An inlet adjacent the top of the cabinet in communication with the heated air plenum receives air from the heated compartment, and a heater fan or blower pulls air from the heated compartment through the inlet and across the elongate heating element to produce heated air. The heated air is forced out of the heated air plenum through the plurality of through openings, flows substantially laminarly across heated food items on meal serving trays in the heated compartment, upwardly along a forward air return area between the front of the trays and the door, and to the heated air plenum inlet where the heated air is cycled back across the elongate heating element by the heater blower.

In a preferred embodiment, each of the thermal dividers separating the refrigerated and heated compartments includes a plurality of thermal dividers vertically arranged within the cabinet. Each of the meal serving trays preferably includes a refrigerated food section positioned within a refrigerated compartment, a heated food section positioned within a heated compartment, and a tray divider section separating the refrigerated food and heated food sections. Each of the thermal dividers is separated from another thermal divider by a divider gap such that the tray divider section of each tray can be slidably positioned at a divider gap.

The present invention also provides an apparatus for transporting prepared meals of refrigerated and heated food items to a meal serving area and for maintaining the refrigerated and heated food items in their refrigerated and heated states for extended periods of time. The apparatus includes a food temperature maintenance cart having a cabinet substantially similar to the cabinet described above. Thus, the present invention contemplates a food temperature apparatus that may be either immobile or easily transported.

BRIEF DESCRIPTION OF THE DRAWING

The above and other features, aspects and advantages of the present invention will now be discussed in the following detailed description and appended claims considered in conjunction with the accompanying drawings in which:

DETAILED DESCRIPTION OF PREFERRED EMBODIMENTS

Figure 1:
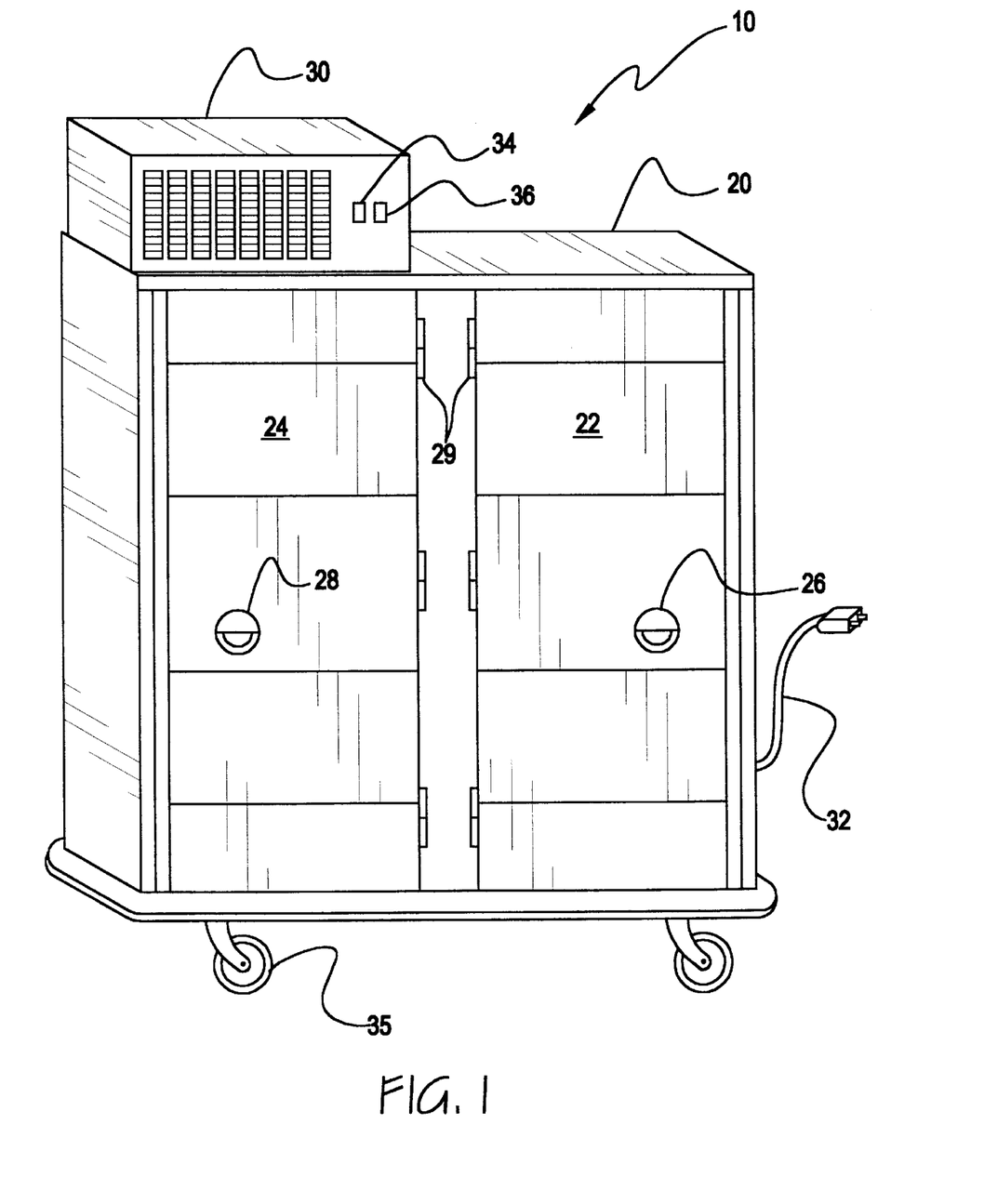
FIG. 1 is a perspective view of a food temperature maintenance cart for transporting trays of prepared meals and for maintaining the temperature of food items on the trays for extended periods of time in accordance with the invention.

With reference now to the drawings in which like reference characters designate like or similar parts throughout the several views, FIG. 1 illustrates a perspective view of a food temperature maintenance cart 10 for maintaining the temperature of prepared meals assembled onto meal serving trays. The cart 10 includes a cabinet 20 for storing trays of prepared meals and a compressor housing unit 30 which houses a refrigeration compressor forming a portion of an on-board refrigeration system for maintaining refrigerated food items in a refrigerated state. The cart 10 also includes an on-board heating system for maintaining heated food items in a heated state. The cabinet 20 is an insulated tray storage area with two access doors 22 and 24 located on the front of the cart 10 providing access to respective tray storage compartments. Each door 22, 24 is provided with a flush mounted door handle 26, 28 and three heavy-duty pin hinges 29. The temperature maintenance cart 10 is preferably constructed of Type 304 stainless steel for easy cleaning. The cart 10 rests on ball-bearing cushioned castered wheels 35 to facilitate movement of the cart 10.

In a preferred embodiment, the cart 10 is supplied with 208 volt, single-phase, 16 ampere electrical power via power cable 32. Alternatively, the cart 10 is configured for operation with other levels of electrical power, such as three-phase power. The cart 10 is simply plugged into an appropriate electrical wall outlet.

The heating system is turned on and off by a rocker switch 34 located on the compressor housing unit 30. A second rocker switch 36 turns the on-board refrigeration system on and off.

Figure 2:
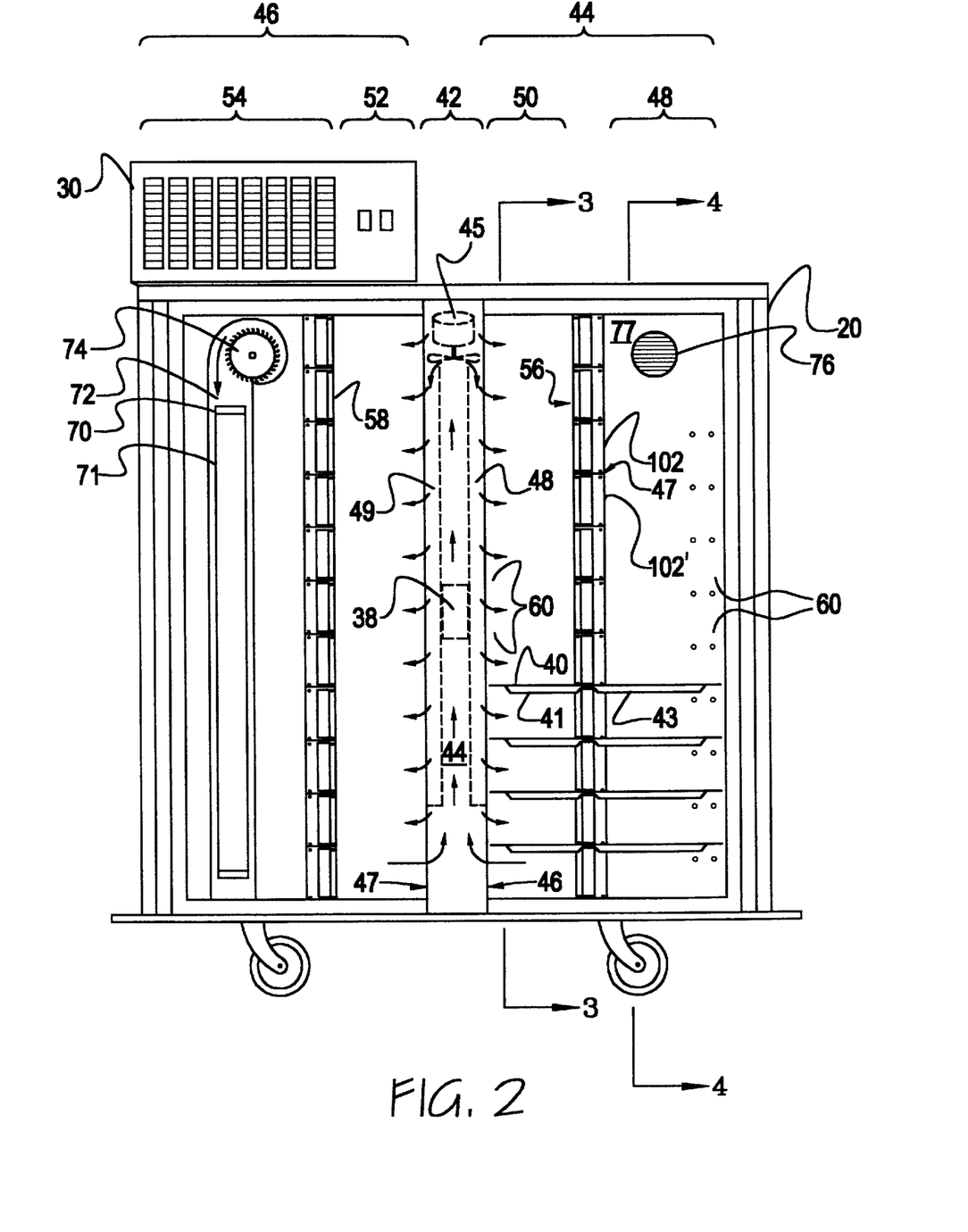
FIG. 2 is a front view of the food temperature maintenance cart of FIG. 1 with the doors removed, showing heated and refrigerated compartments divided by thermal barriers.

FIG. 2 provides a front view of the cart 10 with the doors 22, 24 removed. As FIG. 2 illustrates, the cart 10 is divided by a centrally located refrigerated air delivery compartment 42 into two tray storage compartments 44 and 46. Each of the tray storage compartments 44, 46 is further divided by a thermal barrier into a refrigerated compartment for storing refrigerated food items and a heated compartment for storing heated food items. For example, thermal barrier 56 divides tray storage compartment 44 into a heated compartment 48 and a refrigerated compartment 50. Similarly, thermal barrier 58 divides tray storage compartment 46 into a heated compartment 54 and a refrigerated compartment 52. Thermal barriers 56, 58 serve to isolate heated food items on the trays 40 in the heated compartments 48, 54 and refrigerated food items on the trays 40 in the refrigerated compartments 50, 52.

Each of the tray storage compartments 44, 46 is equipped with tray supports 60 arranged to support the outer edges of the trays 40. The tray supports 40 are positioned as shown to allow for vertical stacking of trays 40 while maintaining sufficient separation between adjacent trays to allow for flow of refrigerated and heated air across the trays 40. In the embodiment of FIG. 2, the cart 10 is configured to store up to twenty food service trays 40. In an alternate cart embodiment, the cart 10 is capable of storing a maximum of twenty-four trays 40.

Refrigerated air is produced in the refrigerated air delivery compartment 42 and supplied to the refrigerated compartments 50, 52. The compressor located in the compressor housing 30 is coupled to an evaporator coil 38 positioned within a refrigeration return plenum 44. A fan or blower 45 positioned above the evaporator coil 38 pulls air from the refrigerated compartments 50, 52 through inlets (shown generally at 46 and 47) formed in the lower portion of the refrigeration return plenum 44. The return air is pulled upwardly by the blower 45, as indicated by air flow arrows in FIG. 2, and across the evaporator coil 38 where the return air is re-cooled. The refrigerated air is then forced downwardly by the blower 45 into dual refrigeration supply plenums, including a refrigeration supply plenum 48 adjacent refrigerated compartment 50 and a refrigeration supply plenum 49 adjacent refrigeration supply plenum 52. Perforations are provided in each of the refrigeration supply plenums 48, 49 to allow refrigerated air to exit the supply plenums 48, 49 and enter the refrigerated compartments 50, 52 between the trays 40, as indicated by air flow arrows. The refrigerated air spills out of the supply plenums 48, 49 and onto the refrigerated food items on the trays 40.

Figure 3:
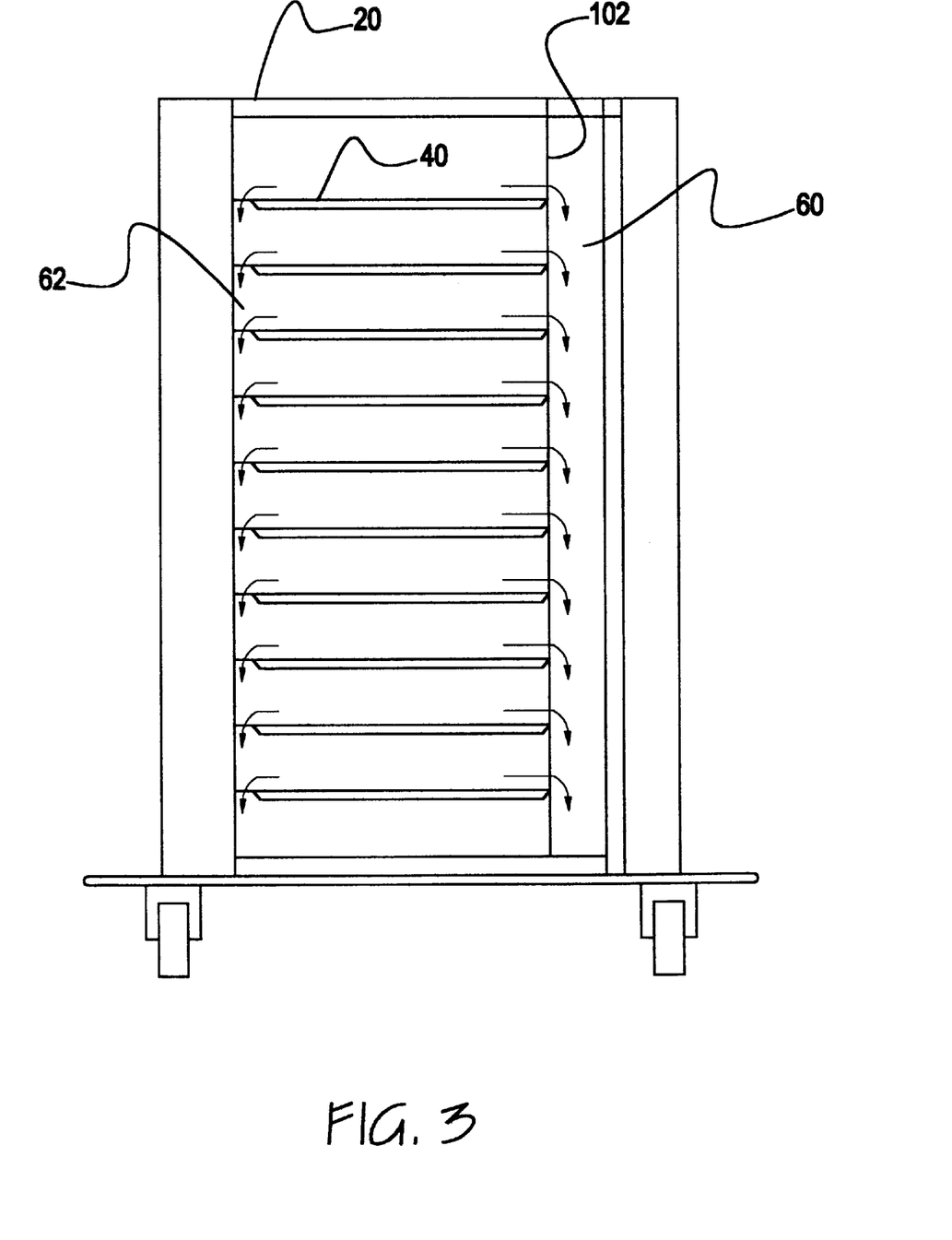
FIG. 3 is a cross-section view of a refrigerated compartment taken along line 3—3 of FIG. 2, showing the general path of refrigerated air flow across the trays.

The refrigerated air flows substantially laminarly across the trays 40 and falls off of the front and back of the trays 40, as shown by the air flow arrows of FIG. 3. The refrigerated air then travels downwardly along a forward air return area 60 between the front of the trays 40 and the doors 22, 24 and downwardly along a rearward air return area 62 between the back of the trays 40 and the back wall of the cabinet 20 to the refrigeration return plenum inlet 46, 47 where the refrigerated air is cycled back across the evaporator coil 38 by the blower 45.

The evaporator coil 38, blower 45, return plenum 44, and supply plenums 48, 49 are positioned centrally with respect to the cart 10 in the refrigerated air delivery compartment 42 so that a single refrigeration system (including the compressor, evaporator coil 38, and blower 45) can supply refrigerated air to both refrigerated compartments 50, 52, thereby increasing the efficiency of the cart 10.

With continued reference to FIG. 2, separate and substantially identical heating systems are employed to provide heated air to the heated compartments 48, 54. With the rear panel of heated compartment 54 removed for purposes of illustration, it can be seen that each heating system includes an elongate heating element 70 positioned within a heated air plenum 72. The heating element 70 is preferably a formed tubular constant resistance heating element, such as a Calrod™ resistance heating element provided by General Electric. The heating element 70 is vertically oriented within the heated air plenum 72 and has a length at least as great as one-half the height of the cabinet 20. A heavy steel bar 71 positioned adjacent the heating element 70 is heated during a pre-heating cycle to help keep heated food items in a heated state when the cart 10 is unplugged during transport. A heater fan or blower 74 positioned near the top of the heated air plenum 72 pulls air out of the heated compartment 54 through a vent or inlet 76 in the rear panel 77 and forces the return air downwardly across the elongate heating element 70 which reheats the air. The heated air is then forced out of the heated air plenum 72 through perforations in the rear panel 77.

Figure 4:
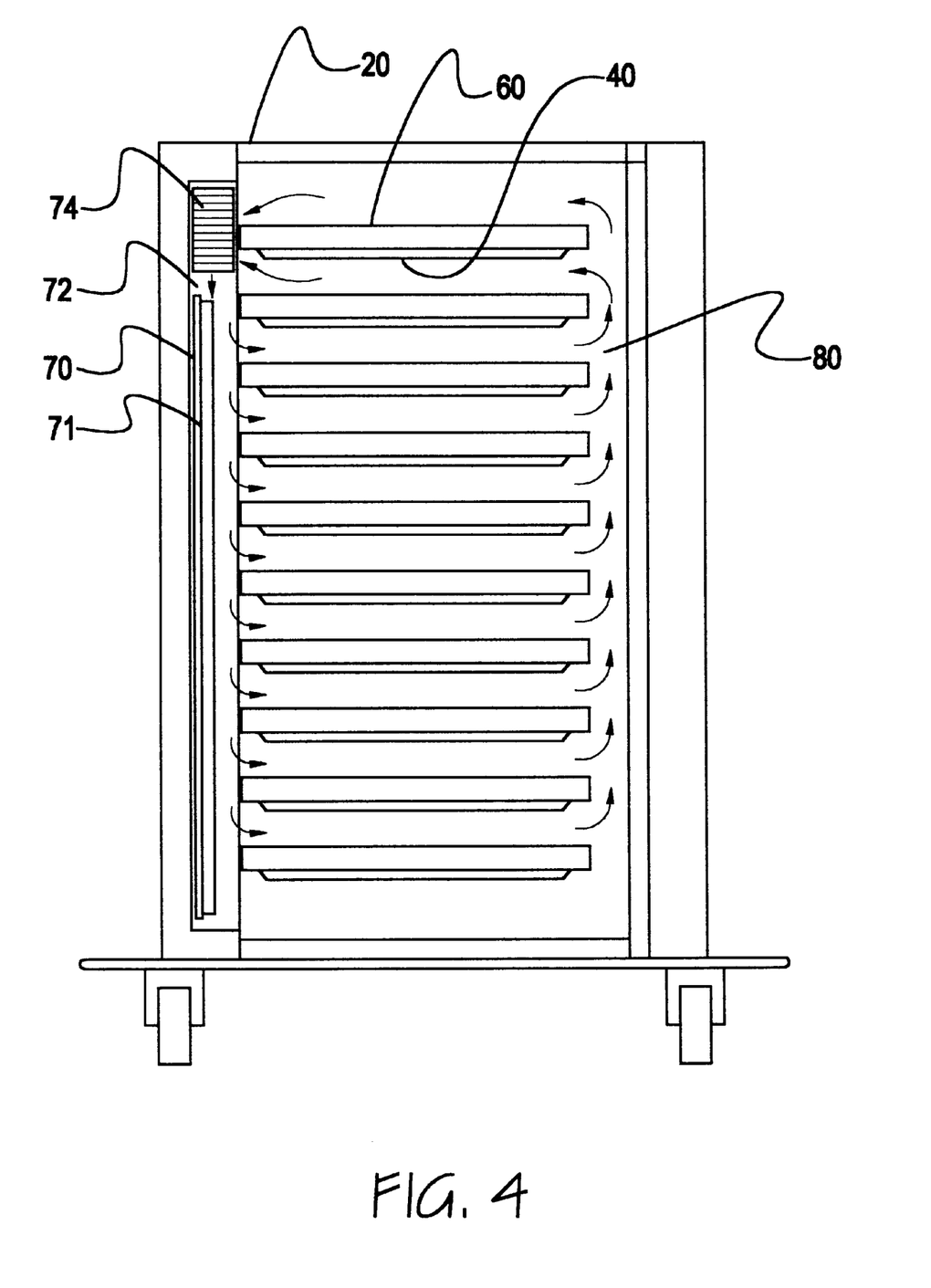
FIG. 4 is a cross-section view of a heated compartment taken along line 4—4 of FIG. 2, showing the general path of heated air flow across the trays.

As shown in FIG. 4, the heated air flows substantially laminarly across heated food items on the meal serving trays 40 and travels upwardly along a forward air return area 80 between the front of the trays 40 and the doors 22, 24. When the heated air reaches the upper portion of the heated compartment 48, 54, it is pulled back across the first and/or second upper trays 40 in substantially laminar flow and to the heated air plenum inlet 76 where the air is cycled back across the elongate heating element 70 by the heating blower 74.

It will be appreciated that the elongate nature of the heating element 70 provides for more constant heating of air throughout the length of the heated air plenum 72. Thus, temperature gradients within the heated compartments 48, 54 are greatly minimized so that more even heating of food items is achieved.

The thermal barrier 100 includes a plurality of vertically arranged dividers 102 which are configured to enable a single food service tray 106 to be loaded with both hot food items, which are stored in hot compartment 90, and cold food items, which are stored in cold compartment 88.

A preferred tray 40 for the cart 10 is one that can be used for loading both hot and cold food items into the cart 10, such as the tray described in U.S. Pat. No. 5,655,595 entitled "Convection Rethermalization System". Generally, the tray 40 includes a cold food side 41 which is loaded with cold food items and a hot food side 43 which is loaded with hot food items. A flat ridge at the midpoint of the tray 40 enables the tray 40 to slide into a gap 47 that is created between two dividers 102, such as dividers 102 and 102' shown in FIG. 2, so that the tray 40 is supported by the lower divider 102' and corresponding tray guides 60 positioned along the outer walls of each tray storage compartment 44, 46. The tray ridge is configured to substantially completely fill the gap 47, thus maintaining thermal separation between the heated and refrigerated compartments 44, 46. With the tray 40 in place, cold food items that have been loaded onto the cold food side 41 of the tray 40 are positioned within the cold compartment 50 and hot food items on the hot food side 43 are positioned in the hot compartment 48.

Figure 5A:
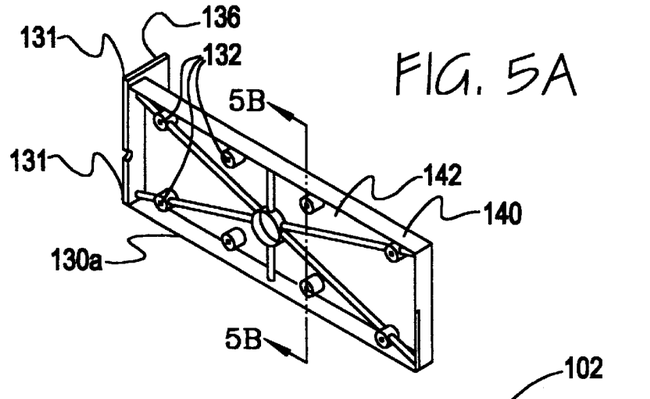
FIG. 5A is a perspective view of a portion of a divider which forms the thermal barrier of FIG. 2.
Figure 5B:
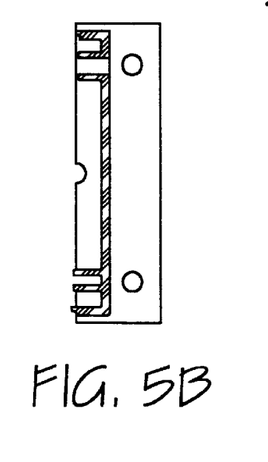
FIG. 5B is a cross-section view of the portion of a divider shown in FIG. 5A.
Figure 5C:
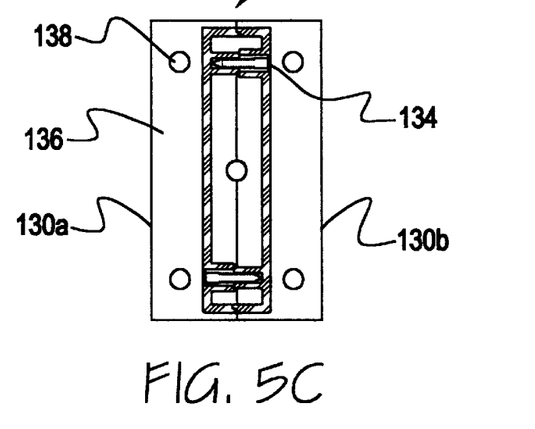
FIG. 5C is a cross-section view of a divider which forms the thermal barrier of FIG. 2.
Figure 5D:
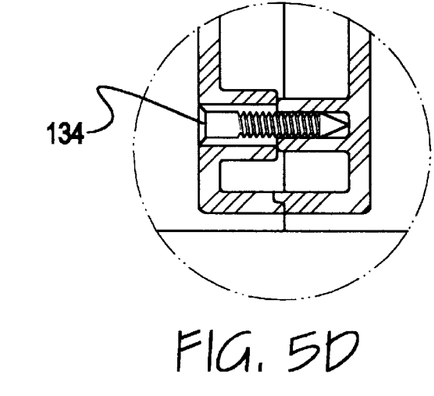
FIG. 5D is a sectional view of the divider of FIG. 5C, illustrating assembly detail.
Figure 5E:
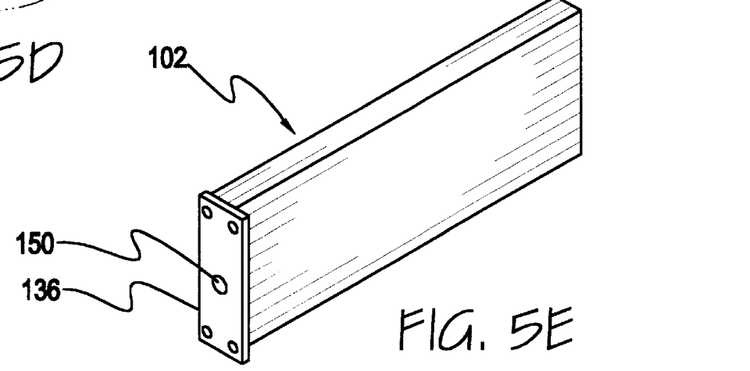
FIG. 5E is a perspective view of an assembled divider.

As FIGS. 5A–E illustrate, each divider 102 is formed from two symmetrical members 130a and 130b as shown, where one of the members 130b is rotated 180 degrees relative to the position of the other member 130a. The two members 130a, 130b are then attached to each other at various attachment points 132 with an appropriate fastener, such as a screw 134, to form the divider 102 as illustrated in FIGS. 5C and 5E. Preferably, each divider member 130a, 130b is formed as a single part from a thermoplastic material, such as GE ULTEM™, to withstand both hot and cold temperatures within the tray storage compartments 44, 46. The divider 102 includes a flange 136 having a plurality of holes 138 through which appropriate fasteners, such as screws, are inserted to attach the flange 136 to the back wall of the cart 10. Each divider 102 is attached to the back wall immediately adjacent another divider 102 to form a vertical array of dividers that make up the thermal barriers 56, 58, as illustrated in FIG. 2. The gap 47 between each divider 102 is created by forming the flange 136 with a small amount of overhang, as generally indicated at 131 in FIG. 5A.

With further reference to FIGS. 5A–E, each divider member 130a, 130b includes a vertical support member 142 connected at one edge to the flange 136. At the remaining three edges of the vertical support member 142 is a continuous lip 140 which contacts the lip 140 of an adjoining divider member 130a, 130b so that when the two divider members 130a, 130b are attached to each other, a volume is defined therebetween. To provide insulation for the thermal barrier 56, 58, the volume defined by each assembled divider 102 is filled with a urethane foam which creates a formed in place insulating barrier at each divider 102. The urethane foam is preferably injected into the divider 102 prior to attachment to post 115 via a foam entry hole 150 formed at the flange 136. Alternatively, each divider 102 may be filled after it is attached to the rear wall of the cart 10.

In a typical operation, food items (hot and cold) are prepared and pre-heated and pre-chilled at a central tray assembly area, placed on the trays 40, and the trays 40 loaded onto the cart 10. The cart 10 is pre-heated and pre-chilled at the central tray assembly area to help maintain the temperature of the food items while the cart 10 is unplugged during transport. After the cart 10 is loaded, it is transported to its destination and immediately plugged in to maintain the temperature of the food items stored therein. Temperatures are controlled automatically by properly positioned, digitally indicating controllers or thermostats. There are no dials to set or turn. Temperatures are pre-set to a desired level, which in a preferred embodiment is 35 degrees F.° for the refrigerated compartments 50, 52 and 180 degrees F.° for the heated compartments 48, 54. All the operator has to do is plug it in and turn on the master switches 34, 36. Thus, it will be appreciated that the invention provides a mobile refrigerator and mobile heated cabinet which maintains food temperatures for an extended time while meals are being served. The result is a safe, appetizing meal which meets stringent governmental regulations for temperature maintenance.

It is contemplated, and will be apparent to those skilled in the art from the foregoing specification, drawings, and examples that modifications and/or changes may be made in the embodiments of the invention. For example, while a preferred embodiment of the invention described above includes castered wheels 35 to enhance mobility of the cabinet 20 and its associated on-board heating and refrigeration systems, it will understood that the invention may be employed in the form of a stationary or fixed position cabinet. Accordingly, it is expressly intended that the foregoing are illustrative of preferred embodiments only, not limiting thereto, and that the true spirit and scope of the present invention be determined by reference to the appended claims.

What is claimed is:

1. A food temperature maintenance apparatus for maintaining refrigerated food items placed on meal serving trays in a refrigerated state and for maintaining heated food items placed on the meal serving trays in a heated state, the apparatus comprising:

a cabinet having a front, a back, a top, and a bottom, said cabinet including:

a first tray storage compartment for storing meal serving trays containing refrigerated and heated food items;

a second tray storage compartment for storing meal serving trays containing refrigerated and heated food items, said second tray storage compartment separated from the first tray storage compartment by a refrigerated air delivery compartment;

a first thermal barrier for thermally isolating refrigerated and heated food items on meal serving trays in the first tray storage compartment, said first thermal barrier dividing the first tray storage compartment into a first refrigerated compartment adjacent the refrigerated air delivery compartment for maintaining refrigerated food items on the meal serving trays in a refrigerated state and a first heated compartment for maintaining heated food items on the meal serving trays in a heated state;

a second thermal barrier for thermally isolating refrigerated and heated food items on meal serving trays in the second tray storage compartment, said second thermal barrier dividing the second tray storage compartment into a second refrigerated compartment adjacent the refrigerated air delivery compartment for maintaining refrigerated food items on the meal serving trays in a refrigerated state and a second heated compartment for maintaining heated food items on the meal serving trays in a heated state;

a first door adjacent the front of the cabinet for accessing the first tray storage compartment; and a second door adjacent the front of the cabinet for accessing the second tray storage compartment;

a refrigerator for providing refrigerated air within the refrigerated air delivery compartment;

said refrigerated air delivery compartment including:

a first refrigeration supply plenum adjacent the first refrigerated compartment and including a plurality of through openings;

a second refrigeration supply plenum adjacent the second refrigerated compartment and including a plurality of through openings;

a refrigeration return plenum having an inlet adjacent the bottom of the cabinet for receiving air from the first and second refrigerated compartments;

a refrigeration coil forming a part of said refrigerator and positioned in said refrigeration return plenum; and a refrigerator blower for producing and circulating refrigerated air through the first and second refrigerated compartments by causing air within the first and second refrigerated compartments to be passed across the refrigeration coil and provided to the first and second refrigeration supply plenums;

wherein refrigerated air within the first refrigeration supply plenum is forced out of the plenum through the plurality of through openings and flows substantially laminarly across refrigerated food items on meal serving trays in the first refrigerated compartment, downwardly along a forward air return area between the front of the trays and the first door and a rearward air return area between the back of the trays and the back of the cabinet, and to the refrigeration return plenum inlet where the refrigerated air is cycled back across the refrigeration coil by the blower;

wherein refrigerated air within the second refrigeration supply plenum is forced out of the plenum through the plurality of through openings and flows substantially laminarly across refrigerated food items on meal serving trays in the second refrigerated compartment, downwardly along a forward air return area between the front of the trays and the second door and a rearward air return area between the back of the trays and the back of the cabinet, and to the refrigeration return plenum inlet where the refrigerated air is cycled back across the refrigeration coil by the blower; and means for heating said first and second heated compartments.

2. The apparatus of claim 1 wherein said means for heating includes:

a first heater for providing heated air to the first heated compartment, said first heater including:

a first heated air plenum having a plurality of through openings for supplying heated air to the first heated compartment;

a first elongate heating element positioned in said first heated air plenum for generating heat;

a first inlet adjacent the top of the cabinet in communication with said first heated air plenum for receiving air from the first heated compartment; and a first heater blower for forcing air received through the first inlet across the first elongate heating element to produce heated air;

wherein heated air within the first heated air plenum is forced out of the plenum through the plurality of through openings and flows substantially laminarly across heated food items on meal serving trays in the first heated compartment, upwardly along a forward air return area between the front of the trays and the first door, and to the first heated air plenum inlet where the heated air is cycled back across the first elongate heating element by the first heater blower; and a second heater for providing heated air to the second heated compartment, said second heater including:

a second heated air plenum having a plurality of through openings for supplying heated air to the second heated compartment;

a second elongate heating element positioned in said second heated air plenum for generating heat;

a second inlet adjacent the top of the cabinet in communication with said second heated air plenum for receiving air from the second heated compartment; and a second heater blower for forcing air received through the second inlet across the second elongate heating element to produce heated air;

wherein heated air within the second heated air plenum is forced out of the plenum through the plurality of through openings and flows substantially laminarly across heated food items on meal serving trays in the second heated compartment, upwardly along a forward air return area between the front of the trays and the second door, and to the second heated air plenum inlet where the heated air is cycled back across the second elongate heating element by the second heater blower.

3. The apparatus of claim 2 wherein each of said first and second elongate heating elements includes a vertically oriented electrical resistance heating element having a length at least as great as 50% of the height of the cabinet.

4. The apparatus of claim 1 wherein each of said first and second thermal barriers includes a plurality of thermal dividers vertically arranged within said cabinet to thermally isolate a heated compartment from a refrigerated compartment, wherein each of said dividers is filled with an insulating material.

5. The system of claim 4 wherein each of said food serving trays includes:

a refrigerated food section positioned within a refrigerated compartment;

a heated food section positioned within a heated compartment; and a tray divider section separating the refrigerated food and heated food sections;

wherein each of said thermal dividers is separated from another thermal divider by a divider gap;

said tray divider section of each meal serving tray being slidably positioned at a divider gap.

6. A food temperature maintenance apparatus for maintaining refrigerated food items placed on meal serving trays in a refrigerated state and for maintaining heated food items placed on the meal serving trays in a heated state, the apparatus comprising:

a cabinet having a front, a back, a top, and a bottom, said cabinet including:

a first tray storage compartment for storing meal serving trays containing refrigerated and heated food items;

a second tray storage compartment for storing meal serving trays containing refrigerated and heated food items;

a first thermal barrier for thermally isolating refrigerated and heated food items on to meal serving trays in the first tray storage compartment, said first thermal barrier dividing the first tray storage compartment into a first refrigerated compartment for maintaining refrigerated food items on the meal serving trays in a refrigerated state and a first heated compartment for maintaining heated food items on the meal serving trays in a heated state;

a second thermal barrier for thermally isolating refrigerated and heated food items on meal serving trays in the second tray storage compartment, said second thermal barrier dividing the second tray storage compartment into a second refrigerated compartment for maintaining refrigerated food items on the meal serving trays in a refrigerated state and a second heated compartment for maintaining heated food items on the meal serving trays in a heated state;

a first door adjacent the front of the cabinet for accessing the first tray storage compartment; and a second door adjacent the front of the cabinet for accessing the second tray storage compartment;

a first heater for providing heated air to the first heated compartment, said first heater including:

a first heated air plenum having a plurality of through openings for supplying heated air to the first heated compartment;

a first elongate heating element positioned in said first heated air plenum for generating heat;

a first inlet adjacent the top of the cabinet in communication with said first heated air plenum for receiving air from the first heated compartment; and a first heater blower for forcing air received through the first inlet across the first elongate heating element to produce heated air;

wherein heated air within the first heated air plenum is forced out of the plenum through the plurality of through openings and flows substantially laminarly across heated food items on meal serving trays in the first heated compartment, upwardly along a forward air return area between the front of the trays and the first door, and to the first heated air plenum inlet where the heated air is cycled back across the first elongate heating element by the first heater blower; and a second heater for providing heated air to the second heated compartment, said second heater including:

a second heated air plenum having a plurality of through openings for supplying heated air to the second heated compartment;

a second elongate heating element positioned in said second heated air plenum for generating heat;

a second inlet adjacent the top of the cabinet in communication with said second heated air plenum for receiving air from the second heated compartment; and a second heater blower for forcing air received through the second inlet across the second elongate heating element to produce heated air;

wherein heated air within the second heated air plenum is forced out of the plenum through the plurality of through openings and flows substantially laminarly across heated food items on meal serving trays in the second heated compartment, upwardly along a forward air return area between the front of the trays and the second door, and to the second heated air plenum inlet where the heated air is cycled back across the second elongate heating element by the second heater blower; and means for providing refrigerated air the first and second refrigerated compartments.

7. The apparatus of claim 6 wherein each of said first and second elongate heating elements includes a vertically oriented electrical resistance heating element having a length at least as great as 50% of the height of the cabinet.

8. The apparatus of claim 6 wherein said means for providing refrigerated air includes:

a refrigerated air delivery compartment separating the first and second refrigerated compartments said refrigerated air delivery compartment including:

a first refrigeration supply plenum adjacent the first refrigerated compartment and including a plurality of through openings;

a second refrigeration supply plenum adjacent the second refrigerated compartment and including a plurality of through openings;

a refrigeration return plenum having an inlet adjacent the bottom of the cabinet for receiving air from the first and second refrigerated compartments;

a refrigeration coil forming a part of said refrigerator and positioned in said refrigeration return plenum; and a refrigerator blower for producing and circulating refrigerated air through the first and second refrigerated compartments by causing air within the first and second refrigerated compartments to be passed across the refrigeration coil and provided to the first and second refrigeration supply plenums;

wherein refrigerated air within the first refrigeration supply plenum is forced out of the plenum through the plurality of through openings and flows substantially laminarly across refrigerated food items on meal serving trays in the first refrigerated compartment, downwardly along a forward air return area between the front of the trays and the first door and a rearward air return area between the back of the trays and the back of the cabinet, and to the refrigeration return plenum inlet where the refrigerated air is cycled back across the refrigeration coil by the blower; and wherein refrigerated air within the second refrigeration supply plenum is forced out of the plenum through the plurality of through openings and flows substantially laminarly across refrigerated food items on meal serving trays in the second refrigerated compartment, downwardly along a forward air return area between the front of the trays and the second door and a rearward air return area between the back of the trays and the back of the cabinet, and to the refrigeration return plenum inlet where the refrigerated air is cycled back across the refrigeration coil by the blower.

9. The apparatus of claim 6 wherein each of said first and second thermal barriers includes a plurality of thermal dividers vertically arranged within said cabinet to thermally isolate a heated compartment from a refrigerated compartment, wherein each of said dividers is filled with an insulating material.

10. The system of claim 6 wherein each of said food serving trays includes:
   a refrigerated food section positioned within a refrigerated compartment;
   a heated food section positioned within a heated compartment; and
   a tray divider section separating the refrigerated food and heated food sections;
   wherein each of said thermal dividers is separated from another thermal divider by a divider gap;
   said tray divider section of each meal serving tray being slidably positioned at a divider gap.

11. An apparatus for transporting prepared meals of refrigerated and heated food items to a meal serving area and for maintaining the refrigerated and heated food items in their refrigerated and heated states for extended periods of time, the apparatus comprising:
   a food temperature maintenance cart having:
      a cabinet having a front, a back, a top, and a bottom, said cabinet including:
         a first tray storage compartment for storing meal serving trays containing refrigerated and heated food items;
         a second tray storage compartment for storing meal serving trays containing refrigerated and heated food items;
         a first thermal barrier for thermally isolating refrigerated and heated food items on meal serving trays in the first tray storage compartment, said first thermal barrier dividing the first tray storage compartment into a first refrigerated compartment for maintaining refrigerated food items on the meal serving trays in a refrigerated state and a first heated compartment for maintaining heated food items on the meal serving trays in a heated state;
         a second thermal barrier for thermally isolating refrigerated and heated food items on meal serving trays in the second tray storage compartment, said second thermal barrier dividing the second tray storage compartment into a second refrigerated compartment for maintaining refrigerated food items on the meal serving trays in a refrigerated state and a second heated compartment for maintaining heated food items on the meal serving trays in a heated state;
         a first door adjacent the front of the cabinet for accessing the first tray storage compartment; and
         a second door adjacent the front of the cabinet for accessing the second tray storage compartment;
      a first heater for providing heated air to the first heated compartment, said first heater including:
         a first heated air plenum having a plurality of through openings for supplying heated air to the first heated compartment;
         a first elongate heating element positioned in said first heated air plenum for generating heat;
         a first inlet adjacent the top of the cabinet in communication with said first heated air plenum for receiving air from the first heated compartment; and
         a first heater blower for forcing air received through the first inlet across the first elongate heating element to produce heated air;
      wherein heated air within the first heated air plenum is forced out of the plenum through the plurality of through openings and flows substantially laminarly across heated food items on meal serving trays in the first heated compartment, upwardly along a forward air return area between the front of the trays and the first door, and to the first heated air plenum inlet where the heated air is cycled back across the first elongate heating element by the first heater blower; and
      a second heater for providing heated air to the second heated compartment, said second heater including:
         a second heated air plenum having a plurality of through openings for supplying heated air to the second heated compartment;
         a second elongate heating element positioned in said second heated air plenum for generating heat;
         a second inlet adjacent the top of the cabinet in communication with said second heated air plenum for receiving air from the second heated compartment; and
         a second heater blower for forcing air received through the second inlet across the second elongate heating element to produce heated air;
      wherein heated air within the second heated air plenum is forced out of the plenum through the plurality of through openings and flows substantially laminarly across heated food items on meal serving trays in the second heated compartment, upwardly along a forward air return area between the front of the trays and the second door, and to the second heated air plenum inlet where the heated air is cycled back across the second elongate heating element by the second heater blower; and
      means for providing refrigerated air the first and second refrigerated compartments.

12. The apparatus of claim 11 wherein each of said first and second elongate heating elements includes a vertically oriented electrical resistance heating element having a length at least as great as 50% of the height of the cabinet.

13. The apparatus of claim 11 wherein said means for providing refrigerated air includes:
   a refrigerated air delivery compartment separating the first and second refrigerated compartments said refrigerated air delivery compartment including:
      a first refrigeration supply plenum adjacent the first refrigerated compartment and including a plurality of through openings;
      a second refrigeration supply plenum adjacent the second refrigerated compartment and including a plurality of through openings;
      a refrigeration return plenum having an inlet adjacent the bottom of the cabinet for receiving air from the first and second refrigerated compartments;
      a refrigeration coil forming a part of said refrigerator and positioned in said refrigeration return plenum; and
      a refrigerator blower for producing and circulating refrigerated air through the first and second refrigerated compartments by causing air within the first and second refrigerated compartments to be passed across the refrigeration coil and provided to the first and second refrigeration supply plenums;
   wherein refrigerated air within the first refrigeration supply plenum is forced out of the plenum through the plurality of through openings and flows substantially laminarly across refrigerated food items on meal serving trays in the first refrigerated compartment, downwardly along a forward air return area between the front of the trays and the first door and a rearward air return area between the back of the trays and the back of the cabinet, and to the refrigeration return plenum inlet where the refrigerated air is cycled back across the refrigeration coil by the blower; and wherein refrigerated air within the second refrigeration supply plenum is forced out of the plenum through the plurality of through openings and flows substantially laminarly across refrigerated food items on meal serving trays in the second refrigerated compartment, downwardly along a forward air return area between the front of the trays and the second door and a rearward air return area between the back of the trays and the back of the cabinet, and to the refrigeration return plenum inlet where the refrigerated air is cycled back across the refrigeration coil by the blower.

14. The apparatus of claim 11 wherein each of said first and second thermal barriers includes a plurality of thermal dividers vertically arranged within said cabinet to thermally isolate a heated compartment from a refrigerated compartment, wherein each of said dividers is filled with an insulating material.

15. The system of claim 11 wherein each of said food serving trays includes:
- a refrigerated food section positioned within a refrigerated compartment;
- a heated food section positioned within a heated compartment; and
- a tray divider section separating the refrigerated food and heated food sections;
- wherein each of said thermal dividers is separated from another thermal divider by a divider gap;
- said tray divider section of each meal serving tray being slidably positioned at a divider gap.

* * * * *